United States Patent
Savry

(10) Patent No.: US 10,536,280 B2
(45) Date of Patent: Jan. 14, 2020

(54) RFID TAG FOR SECURE ACCESS TO A SERVICE FROM AN ACCESS TERMINAL

(71) Applicant: COMMISSARIAT A L'ENERGIE ATOMIQUE ET AUX ENERGIES ALTERNATIVES, Paris (FR)

(72) Inventor: Olivier Savry, Sassenage (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/142,182

(22) Filed: Sep. 26, 2018

(65) Prior Publication Data
US 2019/0103980 A1 Apr. 4, 2019

(30) Foreign Application Priority Data
Oct. 4, 2017 (FR) ...................... 17 59291

(51) Int. Cl.
| | |
|---|---|
| H04M 1/66 | (2006.01) |
| H04L 9/32 | (2006.01) |
| H04W 4/80 | (2018.01) |
| H04W 12/06 | (2009.01) |
| G06K 19/073 | (2006.01) |
| G06K 19/077 | (2006.01) |
| H04W 12/08 | (2009.01) |

(52) U.S. Cl.
CPC .......... *H04L 9/3273* (2013.01); *G06K 19/073* (2013.01); *H04W 4/80* (2018.02); *H04W 12/06* (2013.01); *G06K 19/0775* (2013.01); *H04L 2209/805* (2013.01); *H04W 12/08* (2013.01)

(58) Field of Classification Search
CPC ..... H04W 12/06; H04W 12/08; H04W 12/12; H04W 88/02
USPC .................................................. 455/410, 411
See application file for complete search history.

(56) References Cited

U.S. PATENT DOCUMENTS

| | | | |
|---|---|---|---|
| 9,565,022 B1 | 2/2017 | Robshaw et al. | |
| 2010/0001840 A1* | 1/2010 | Kang ....................... | H04Q 9/00 340/10.1 |
| 2013/0251151 A1* | 9/2013 | Yamada ................ | H04L 9/0877 380/270 |

(Continued)

OTHER PUBLICATIONS

U.S. Appl. No. 15/412,252, filed Jan. 23, 2017, 2017/0214523 A1, Florian Pebay-Peyroula, et al.

(Continued)

*Primary Examiner* — Temica M Beamer
(74) *Attorney, Agent, or Firm* — Oblon, McClelland, Maier & Neustadt, L.L.P.

(57) ABSTRACT

The invention relates to an RFID tag adapted to access a service of interest from an access terminal, said RFID tag (1) comprising an integrated circuit (3) configured to:
enable a cryptographic authentication of the RFID tag (1) by said access terminal (7) using a current cryptography key shared by the RFID tag (1) and the access terminal (7), said authentication allowing access to said service of interest, and
enable the RFID tag (1) to recover a new current cryptography key updated by an NFC smartphone after said NFC smartphone has authenticated the RFID tag (1), using an initial cryptography key previously shared between the RFID tag (1) and said smartphone.

13 Claims, 4 Drawing Sheets

(56) References Cited

U.S. PATENT DOCUMENTS

2016/0099753 A1* 4/2016 Murray ............... H04B 5/0062
  455/41.1
2016/0116976 A1* 4/2016 Russell ................. G06Q 10/00
  340/10.5

OTHER PUBLICATIONS

U.S. Appl. No. 15/442,362, filed Feb. 24, 2017, 2017/0250822 A1, Olivier Savry.
U.S. Appl. No. 15/440,157, filed Feb. 23, 2017, 2017/0244553 A1, Olivier Savry, et al.
U.S. Appl. No. 15/656,613, filed Jul. 21, 2017, 2018/0032718 A1, Patrick Soto, et al.
French Preliminary Search Report dated Jul. 6, 2018 in French Application 17 59291, filed on Oct. 4, 2017 (with English Translation of Categories of cited documents).
Dass P., et al. "A secure authentication scheme for RFID systems", Procedia Computer Science, vol. 78, 2016, pp. 100-106.
Surekha, B., et al. "A Realistic Lightweight Authentication Protocol for Securing Cloud based RFID System", 2016 IEEE International Conference on Cloud Computing in Emerging Markets (CCEM), 2016, pp. 54-60.

\* cited by examiner

RFID TAG FOR SECURE ACCESS TO A SERVICE FROM AN ACCESS TERMINAL

TECHNICAL DOMAIN

This invention relates to the field of using an RFID tag to access a data service from an access terminal in a secure manner using a cryptography key. The invention also relates to the use of a smartphone to update the cryptography key.

STATE OF PRIOR ART

At the present time, a smartphone equipped with an NFC (Near Field Communication) reader can read (and/or write on) ISO 14443 cards called proximity cards at a distance of up to about 10 cm and can read ISO 15693 tags called vicinity tags up to about 1 m from the smartphone. Furthermore an NFC smartphone can also be used to obtain encrypted access to an access terminal. An authentication of an entity equipped with an NFC reader can be made in an encrypted manner by the NFC smartphone using a cryptography key shared with this entity. In this case, it is necessary that the cryptography is stored in the smartphone in a secure manner. It can be stored in the chip (Secure Element) of the smartphone, or in the SIM card (or the Universal Integrated Circuit Card (UICC) thus enabling passive use of the smartphone because these two circuits are directly connected to the NFC reader. Furthermore, these two elements are the only elements with secure storage capacities including protection against physical type attacks or attacks through auxiliary channels.

However, the chip (Secure Element) is locked by the phone manufacturer or by the supplier of the operating system OS (for example Android or iOS) who reserves the exclusive right to use it principally for payment applications. For the same reasons, the SIM card (or UICC) is also locked by telephone operators.

Thus, a manufacturer who would like to make an application requiring passive use of the NFC has no viable solution. His only alternative is to store the cryptography key either in the application that he installs on the phone or in a TEE (Trusted Execution Environment) type processor. Neither of these two solutions can make passive use of the NFC reader (i.e. when the phone is switched off or the battery is low). Furthermore, the TEE processor is not very secure and on the other hand, storage in the application is exposed to all sorts of software attacks such as reverse engineering (overflow buffers), malware, viruses, etc.

Furthermore, an RFID tag cannot be used to obtain secure access to a service from an access terminal in a secure manner using a cryptography key, and even more so cannot protect the cryptography key from external attacks.

The purpose of this invention is to disclose a secure access using an RFID tag to a given service on an access terminal using a cryptography key that overcomes the above-mentioned disadvantages, particularly making optimal and passive use of the NFC of a smartphone to further secure access to the access terminal.

PRESENTATION OF THE INVENTION

This purpose is achieved with an RFID tag adapted to access a service of interest from an access terminal, said tag comprising an integrated circuit configured to:
enable a cryptographic authentication of the tag by said access terminal using a current cryptography key shared by the tag and the access terminal, said authentication allowing access to said service of interest, and
enable the tag to recover a new current cryptography key updated by an NFC smartphone after said NFC smartphone has authenticated the tag, using an initial cryptography key previously shared between the tag and said smartphone. It will be noted that said initial cryptography key corresponds to the previously current cryptography key, in other words the key that was contained in the RFID tag before the current new cryptography was recovered.

This enables a user to make a secure access to a service or application of interest with a simple RFID tag, while allowing a simple and secure update to the cryptography key in the RFID tag (for example, daily) so as to counter physical vulnerabilities of this RFID tag. Furthermore, the RFID tag always remains operational to access the access terminal, even if the smartphone is switched off or is no longer functional. The smartphone can be switched off as long as there is no need for a cryptography key to be updated, while maintaining the authentication function. Furthermore, no key storage is necessary in the smartphone.

Advantageously, said integrated circuit comprises cryptographic authentication schemes and specific challenge-response, authenticate and update commands of the cryptography key, defined according to ISO standard 15693-3 (amendment 4). Many security functions can thus be obtained in compliance with amendment 4 to ISO 15693-3.

Advantageously, the RFID tag is located close to said smartphone during an operation to update the cryptography key. This makes it possible to make a simple update while allowing the tag to securely access an application without the smartphone.

According to another embodiment of the invention, the RFID tag is glued to said smartphone. This makes it possible to have the RFID tag permanently close to the smartphone.

Advantageously, the RFID tag is glued onto the back of the smartphone or onto the case protecting the smartphone facing the NFC antenna of the smartphone. This enables optimal coupling between the two antennas.

According to another embodiment of the invention, the RFID tag is glued onto a card or a badge.

The invention also relates to an authentication device comprising the RFID tag according to one or several of the above characteristics and an NFC smartphone configured to authenticate the RFID tag and to update the RFID tag cryptography key.

Advantageously, the NFC smartphone is configured to:
connect to a service provider's server using a first secure Internet connection,
then recover an initially predefined cryptography key in the RFID tag, from said server;
communicate with the RFID tag, through its NFC function,
authenticate the RFID tag through said cryptography key initially shared by the RFID tag,
update the cryptography key by starting generation of a new current cryptography key with the service provider's server, and
transfer the new current cryptography key into the RFID tag.

Advantageously, said smartphone is configured to:
give an inventory order to find and select the identity of the RFID tag,
issue a challenge command then an authentication command to authenticate the RFID tag.

Advantageously, different RFID tags corresponding to different applications are glued onto the smartphone.

The invention also relates to an authentication system comprising the authentication device according to any one of the above characteristics, an access terminal and a service provider's server, said access terminal being configured to:

connect to said service provider's server using a second secure Internet link, recover the current cryptography key from said server, and authenticate the RFID tag using said current cryptography key to enable the tag to access the service of interest.

Advantageously, the first and second secure links comprise a protocol assuring confidentiality of the links chosen from among the following links: SSL/TLS, IPSEC, SSH.

Advantageously, said service provider's server is configured to provide the cryptography key to the smartphone and to the access terminal independently using the first and the second secure links.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

Figure 1:
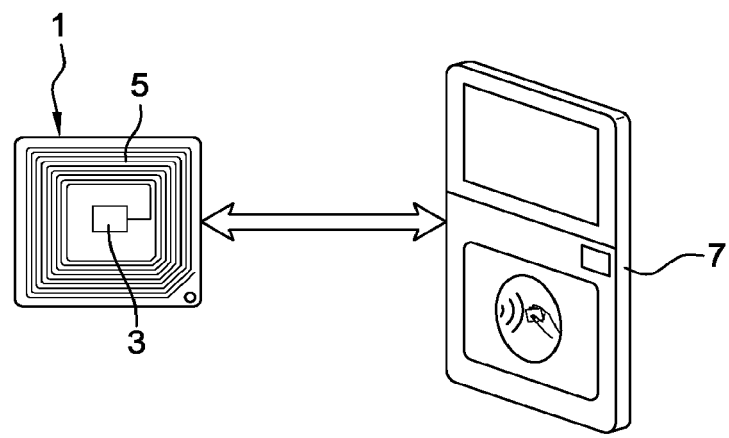
FIG. 1 diagrammatically illustrates an RFID tag adapted to access a service of interest from an access terminal, according to one embodiment of the invention.

FIG. 1 diagrammatically illustrates an RFID tag adapted to access a service of interest from an access terminal, according to one embodiment of the invention.

The radio-tag or the RFID (Radio Frequency Identification) tag 1 comprises an integrated circuit 3 and an antenna 5 connected to the integrated circuit 3. The integrated circuit 3 comprises an NFC (Near Field Communication) reader configured to receive radio signals through the antenna 5 from an external entity also provided with an NFC reader and to emit radio signals to this external entity that can be an access terminal 7 to an application or a service.

The integrated circuit 3 is configured to enable cryptographic authentication of the RFID tag 1 by the access terminal 7 through a current cryptography key shared by the RFID tag 1 and the access terminal 7. This authentication enables a user of the RFID tag to obtain secure access to an application or service of interest provided through the access terminal 7.

The integrated circuit 3 of the RFID tag 1 comprises cryptographic authentication schemes and other security functions introduced by the ISO 15693-3 standard (amendment "4").

More particularly, amendment "4" of ISO 15693-3 introduces a large number of new security functions for RFID tags, including:

Characteristics of cryptographic authentication schemes based on the catalogue of cryptographic series in ISO standard 29167-X that enable the use of AES (Automated Algebraic Cryptanalysis), PRESENT, or GRAIN128 type cryptographic analyses as symmetric primitives. Each cryptographic series is identified by an identifier on 8 bits (CSI) defined in ISO standard 29167-1. This new security framework enables authentication or mutual authentication and an exchange of encrypted messages.

A new "Secure State" can be selected to activate these security functions.

Specific bits in the response of the RFID tag can communicate the state of the cryptographic calculation (that can take longer than simple exchanges of frames) and to use error codes to notify if a problem arises.

The response from the tag of a Barker code on 7 bits (0100111b) and an $8^{th}$ end bit "done flag" that shows if the tag is still performing a command or if it has finished (b8=1).

The transition from the "ReadyState" in the state diagram to the "SecureState" is made when an authentication or mutual authentication is successful in accordance with the crypto series used. The same type of constraint is applicable to change from the "Quiet" state to the "SecureState".

Specific security commands are added containing the following commands: "Challenge", "Authenticate", "KeyUpdate", "AuthCom" and "SecureCom".

The RFID tag can respond immediately or synchronously (the tag continues to respond every 20 ms indicating that it is still calculating its response) or asynchronously (after a first response, the tag waits until it has finished its calculation before sending the final response).

The "Challenge" command sent by the reader informs one or several tags that it (they) should calculate the encryption of the challenge using the specified crypto series. This value is kept in memory while waiting for an "Authenticate" command.

The "Authenticate" command enables an authentication of the tag or the reader or even a mutual authentication according to the crypto series used by sending the value calculated during the "Challenge" command. If the authentication is successful, the tag puts itself into "SecureState" mode.

The "KeyUpdate" command changes the cryptographic key used. It can only be used after a valid authentication. The new key is sent encrypted by the old key, thus respecting confidentiality.

The "AuthCom" command associates a MAC (Message Authentication Code) with a message.

The "SecureCom" command sends encrypted messages.

Therefore the ISO standard 15693-3 amendment "4" enables authentication of the RFID tag 1 using the specified crypto series and a change of the key in all confidentiality.

Figure 2:
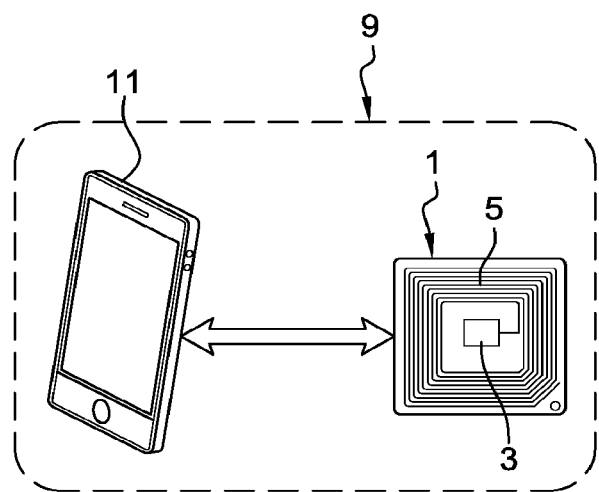
FIG. 2 diagrammatically illustrates an authentication device comprising an RFID tag and an NFC smartphone, according to one embodiment of the invention.

FIG. 2 diagrammatically illustrates an authentication device comprising an RFID tag and an NFC smartphone, according to one embodiment of the invention.

The authentication device 9 comprises an RFID tag 1 and an NFC smartphone 11 placed in the vicinity of the RFID tag 1 and in any case at a distance of less than about 1 m. It will be noted that NRC near field communication consists of a short-range wireless link up to a distance of about one metre.

The RFID tag 1 and the NFC smartphone 11 of the authentication device 9 share the same cryptography key enabling secure wireless communication between the two elements. The integrated circuit 3 of the RFID tag 1 comprises security functions according to amendment "4" of ISO 15693-3 as described above and more particularly, cryptographic authentication schemes and specific "challenge-response", "authentication" and "update" commands of cryptography keys. This enables the RFID tag 1 to recover a new cryptography key updated by the NFC smartphone after said NFC smartphone has authenticated the RFID tag using the initial cryptography key previously shared between the RFID tag 1 and the NFC smartphone 11 (see FIG. 4).

Obviously, during the cryptography key update operation, the RFID tag 1 is located close to the NFC smartphone 11.

According to one embodiment of this invention, the RFID tag 1 can be glued on a card or a badge that is placed close to the NFC smartphone 11 during the update of the cryptography key.

Figure 3:
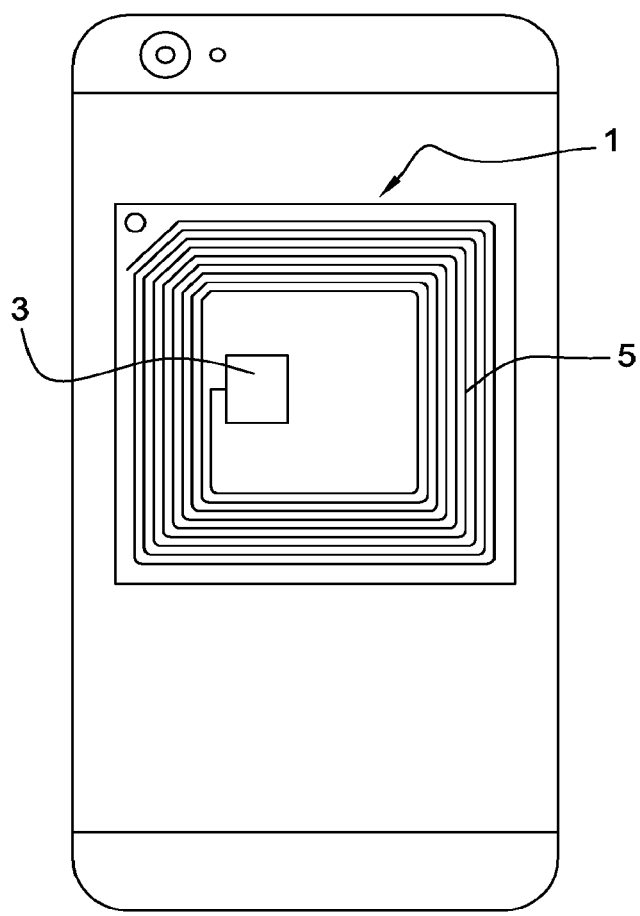
FIG. 3 diagrammatically illustrates an RFID tag glued to the NFC smartphone, according to a preferred embodiment of the invention.

According to another preferred embodiment of this invention, the RFID tag 1 is glued onto the NFC smartphone 11 as shown on FIG. 3.

In particular, the RFID tag 1 can be glued on the smartphone 11 facing the antenna of the NFC reader (not shown) built into the smartphone 11 thus optimising coupling between the antenna 5 of the RFID tag 1 and the antenna of the NFC reader of the smartphone 11. It is thus advantageous to glue the RFID tag 1 to the cover on the back of the smartphone 11 facing the battery on which the NFC antenna of the smartphone 11 is generally located. It can also be glued on the back of a protection case of the smartphone 11 or between the case and the smartphone 11, where it will then be invisible. It can also be completely integrated into the case.

Advantageously, different RFID tags 1 corresponding to different applications can be glued onto the smartphone 11. The stack of RFID tags 1 does not cause any problem because the NFC technology is designed to read stacked tags due to a small offset in the resonant frequency of the antenna.

Figure 4:
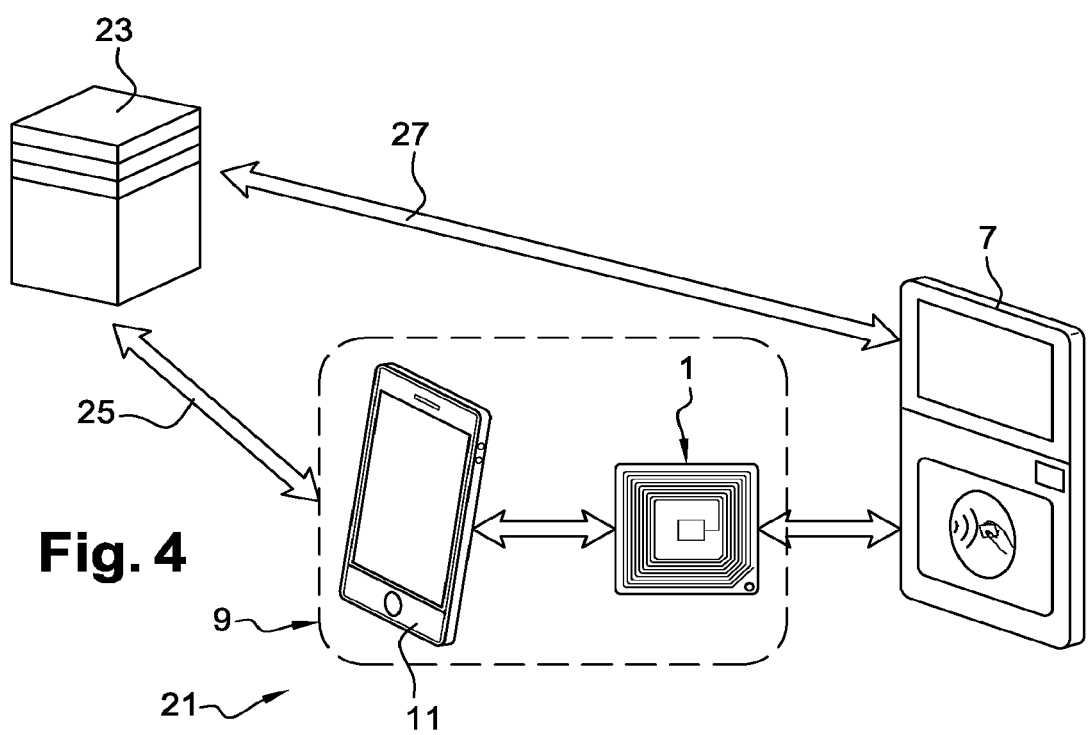
FIG. 4 diagrammatically illustrates an authentication system, according to a preferred embodiment of the invention.

FIG. 4 very diagrammatically illustrates an authentication system according to one preferred embodiment of the invention.

The authentication system 21 comprises the RFID tag 1, the NFC smartphone 11, the access terminal 7 provided with an NFC reader and a service provider's server 23. The authentication device 9 composed of the RFID tag 1 and the NFC smartphone 11 thus forms part of an ecosystem that includes the service provider's server 23 and the access terminal 7 adapted to authenticate the RFID tag 1 before giving access for example to a building, a car, a payment, or information, etc. First and second secure and independent links 25, 27 are maintained between firstly the service provider's server 23 and secondly the NFC smartphone 11 and the access terminal 7, respectively. The first and second secure links 25, 27 are made using secure 3G/4G/5G internet connections making use of a protocol assuring confidentiality of links, selected from among the following types of links: SSL/TLS, IPSEC, SSH or another protocol guaranteeing confidentiality, or even by SMS. Connections can also be relayed through a computer in Bluetooth or Wifi. The first and second secure Internet links 25, 27 enable the service provider's server 23 to provide a cryptography key to the smartphone 11 and the access terminal 7, shared through the RFID tag 1. More particularly, the first link 25 can be used to initialise the cryptography in the RFID tag 1 or to update it through the smartphone 11, while the second link 27 that is independent of the first link 25 enables the access terminal 7 to recover the cryptography key shared by the RFID tag 1.

Figure 5:
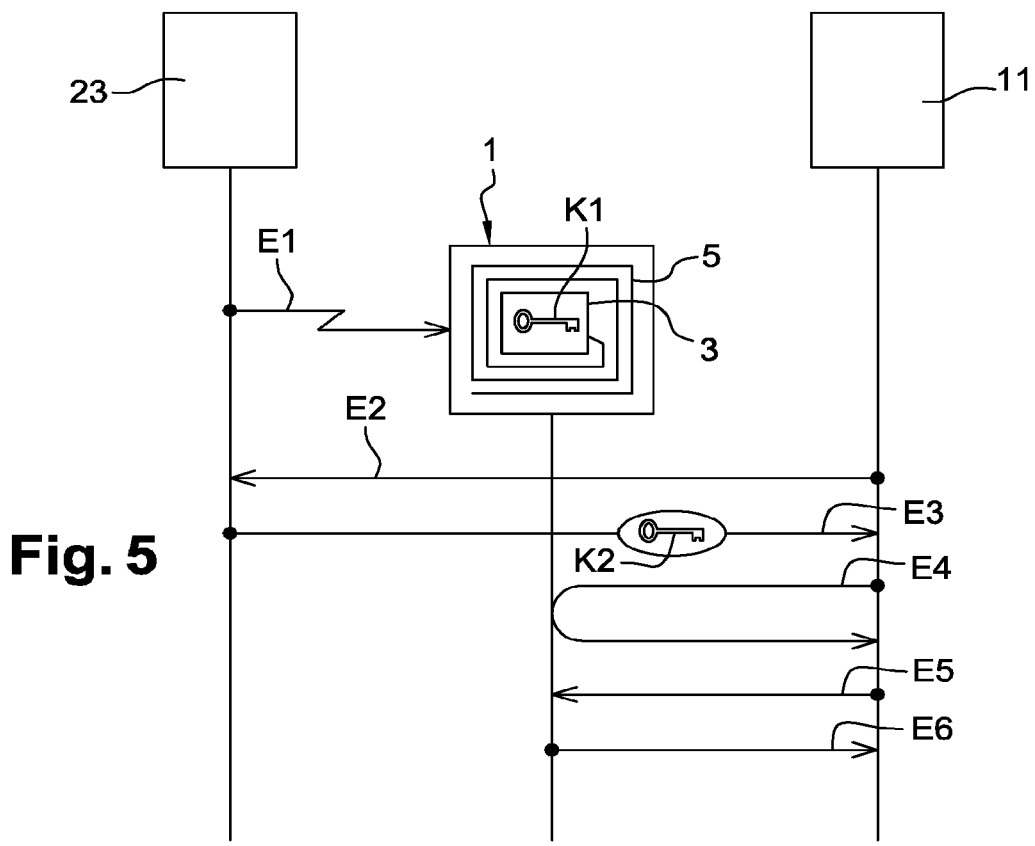
FIG. 5 diagrammatically illustrates a method of initialising the cryptography key in the RFID tag, according to one embodiment of the invention.

FIG. 5 diagrammatically illustrates steps in a method of initialising the cryptography key in the RFID tag, according to one embodiment of the invention.

At the beginning (step E1) the service provider's server 23 provides the RFID tag 1 comprising the cryptography key to a client or user to provide secure access to a service of interest from the access terminal 7. The RFID tag 1 thus comprises an initial cryptography key K1 known by the service provider's server 23.

In step E2, the NFC smartphone 11 is configured to be connected through the first secure Internet link 25 to the service provider's server 23.

In step E3, the NFC smartphone 11 is configured to recover the initial cryptography key K1 predefined in the RFID tag 1, from the service provider's server 23.

It is also considered that the NFC smartphone 11 is provided with an application that communicates with the RFID tag 1 due to its NFC function. For example, this application may have been installed beforehand by the user.

In step E4, the NFC smartphone 11 is configured to give an "Inventory" command by which it can find and select the identity of the RFID tag 1.

In step E5, the NFC smartphone 11 is configured to give a "Challenge" command to the RFID tag 1, followed by an "Authenticate" command with the initial cryptography key K1 shared with the RFID tag 1 and that it had previously recovered (in step E3) from the service provider's server 23.

In step E6, the NFC smartphone 11 verifies the response of the RFID tag 1 and if it corresponds to the encrypted part of the challenge, then the tag 1 is considered to have been authenticated by the NFC smartphone 11.

Figure 6:
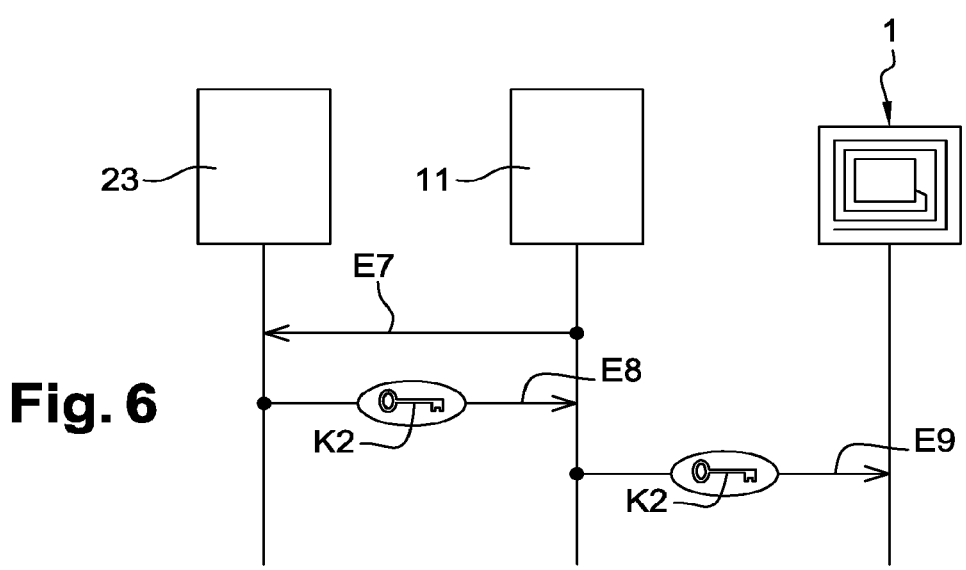
FIG. 6 diagrammatically illustrates a method of updating the cryptography key in the RFID tag, according to one embodiment of the invention.

FIG. 6 diagrammatically illustrates steps to update the cryptography key in the RFID tag, according to one embodiment of the invention.

After authentication of the RFID tag 1 by the NFC smartphone 11 according to the previous steps (E2 to E6), the NFC smartphone 11 updates the cryptography key in step E7 by giving a "KeyUpdate" command on the service provider's server 23 that generates a new current cryptography key K2.

In step E8, the NFC smartphone 11 recovers the new current cryptography key K2 from the service provider's server 23 through the first secure link 25.

The NFC smartphone 11 then transfers the new current cryptography key K2 in the RFID tag 1, in step E9. The initial cryptography key K1 in the RFID tag 1 is replaced by the new current cryptography key K2.

This type of update can be made fairly frequently (for example daily) to limit exposure of the cryptography key to leakage caused by physical attacks or attacks through auxiliary channels (DPA, CPA, SPA, etc.). It will be noted that throughout all these communications, the initial or current cryptography keys never appear unencrypted. The initial and current cryptography keys are always encrypted by the secure Internet communication (for example TLS/SS) between the server 23 and the smartphone 11. Furthermore, each current cryptography key K2 is secured by encryption using the previous cryptography key K1 during its transfer from the NFC smartphone 11 to the RFID tag 1. Advantageously, there is no need for the NFC smartphone 11 to know the cryptography key, and there is even less reason to store it.

Furthermore, once the current cryptography key K2 has been transferred in the RFID tag 1, the NFC smartphone 11 no longer performs any role and access to the access terminal takes place exclusively between the access terminal and the RFID tag 1.

Figure 7:
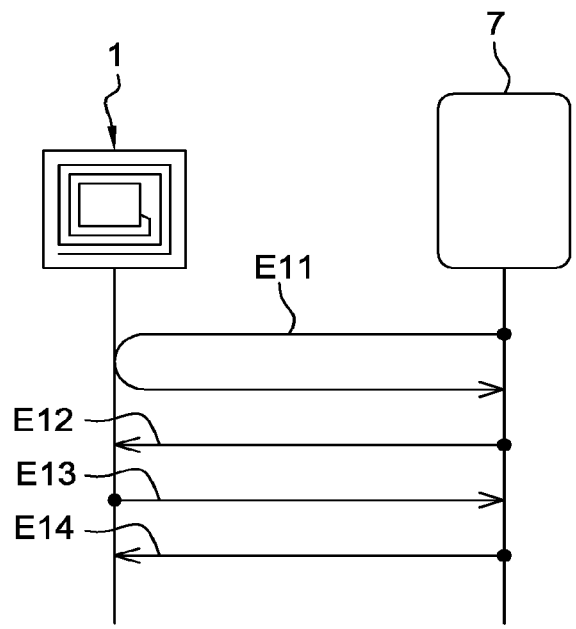
FIG. 7 diagrammatically illustrates a method by which the RFID tag accesses the service of interest from the access terminal, according to one embodiment of the invention.

FIG. 7 diagrammatically illustrates the steps to be followed for the RFID tag to access the service of interest of the access terminal, according to one embodiment of the invention.

In step E11, the access terminal 7 sends an "Inventory" command to the RFID tag 1. It will be noted that if the NFC smartphone 11 is switched on, the access terminal 7 will see the response of the NFC reader of the smartphone 11 and the response of the RFID tag 1. The "AFI" and "UID" identifications of the RFID tag 1 enable the access terminal 7 to identify and select the RFID tag 1 without any risk of error.

In step E12, the access terminal 7 sends a "Challenge-response" command to the RFID tag 1 and then an "Authenticate" command, knowing that the two entities share the same cryptography key K2.

In step E13, the access terminal 7 verifies the response of the RFID tag 1 and if it corresponds to the encrypted part of the challenge, then the RFID tag 1 is considered to have been authenticated. The access terminal 7 already knows the current cryptography key K2, due to the service provider's server 23 (see FIG. 8). It will also be noted that depending on the crypto series used on the RFID tag, the RFID tag can also authenticate the access terminal or make a mutual authentication.

Finally, in step E14, the access terminal 7 provides access to the service of interest requested by the user of the RFID tag 1.

Figure 8:
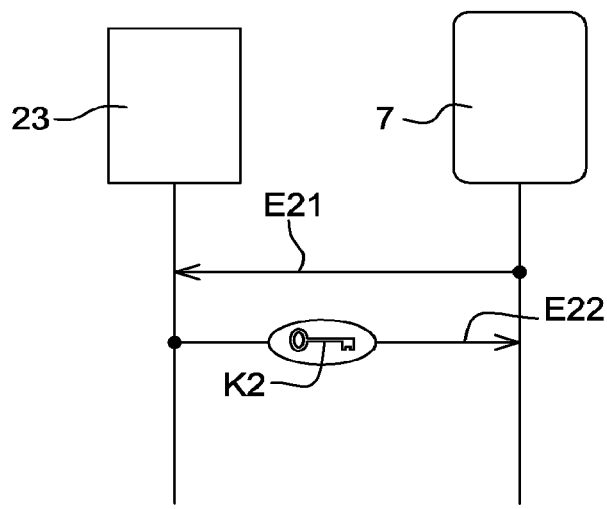
FIG. 8 diagrammatically illustrates a method for the access terminal to recover the current cryptography key, according to one embodiment of the invention.

FIG. 8 diagrammatically illustrates steps in recovery of the current cryptography key by the access terminal, according to one embodiment of the invention.

In step E21, the access terminal 7 connects itself through the second secure Internet link 27 to the service provider's server 23, to know the current cryptography key K2 shared with the RFID tag 1.

In step E22, the access terminal 7 recovers the current cryptography key K2 from the service provider's server 23. It can then use this current cryptography key K2 to authenticate the RFID tag 1 to enable the user of the RFID tag 1 to access the service of interest, as indicated by the method with reference to FIG. 7.

It will be noted that the different embodiments of the invention have several advantages that are not present in prior art and particularly the following advantages:

The authentication device is more compact.

No disassembly of the smartphone or physical connection is necessary.

Independence from the smartphone manufacturer, the telephone operator and the operating system (OS).

The cryptography key does not need to be stored in the smartphone.

The smartphone can be switched off as long as there is no need for a cryptography key to be updated, while maintaining the authentication function.

It is easier for the user to loan the RFID tag to someone, rather than to loan the smartphone.

Finally, the cryptography key can be updated frequently.

The invention claimed is:

1. An RFID tag adapted to access a service of interest from an access terminal, wherein said RFID tag comprises an integrated circuit configured to:
    enable a cryptographic authentication of the RFD tag by said access terminal using a current cryptography key shared by the RFID tag and the access terminal, said authentication allowing access to said service of interest, and
    enable the RFID tag to receive a new current cryptography key from a Near Field Communication (NFC) smartphone after said smartphone has authenticated the RFID tag, using an initial cryptography key previously stored in the RFID tag and said smartphone, wherein the new current cryptography key replaces the current cryptography key for subsequent cryptographic authentication of the RFID tag by the access terminal.

2. The RFID tag according to claim 1, wherein said integrated circuit comprises cryptographic authentication schemes and specific challenge-response, authenticate, and update commands of the current c graphy key, defined according to ISO standard 15693-3 (amendment 4).

3. The RFD tag according to claim 1, wherein the RFID tag is located close to said smartphone during an operation to receive the new current cryptography key.

4. The RFID tag according to claim 1, wherein the RFID tag is glued onto said smartphone.

5. The RFID tag according to claim 4, wherein the RFID tag is glued onto a back of the smartphone or onto a case protecting the smartphone facing an NFC antenna of the smartphone.

6. The RFID tag according to claim 1, wherein the RFID tag is glued onto a card or a badge.

7. An authentication device comprising the RFID tag according to claim 1, further comprising the smartphone configured to authenticate the MD tag and to update the current cryptography key of the RFID tag.

8. The authentication device according to claim 7, wherein the smartphone is configured to:
    connect to a service provider's server using a first secure Internet connection,
    recover the initial cryptography key previously stored in the RFID tag, from said service provider's server,
    communicate with the RFID tag, through NFC function,
    authenticate the RFID tag through said initial cryptography key previously stored in the RFID tag,
    update the current cryptography key by starting generation of a new current cryptography key with the service provider's server, and
    transfer the new current cryptography key into the RFID tag.

9. The authentication device according to claim 8, wherein said smartphone is configured to:
    give an inventory order to find and select an identity of the RFID tag, and
    issue a challenge command then an authentication command to authenticate the RFID tag.

10. The authentication device according to claim 7, wherein different RFID tags corresponding to different applications are glued onto the smartphone.

11. An authentication system comprising the authentication device according to claim 8, further comprising an access terminal and a service provider's server, said access terminal being configured to:
    connect to said service provider's server using a second secure Internet link,
    receive the current cryptography key from said service provider's server, and authenticate the RFID tag using said current cryptography key to enable the RFID tag to access the service of interest.

12. The authentication system according to claim 11, wherein the first and second secure links comprise a protocol assuring confidentiality of the first and second secure links chosen from among SSL/TLS, IPSEC, SSH.

13. The authentication system according to claim 11, wherein said service provider's server is configured to provide the current cryptography key to the smartphone and to the access terminal independently using the first and the second secure links.

\* \* \* \* \*